United States Patent Office 3,544,515
Patented Dec. 1, 1970

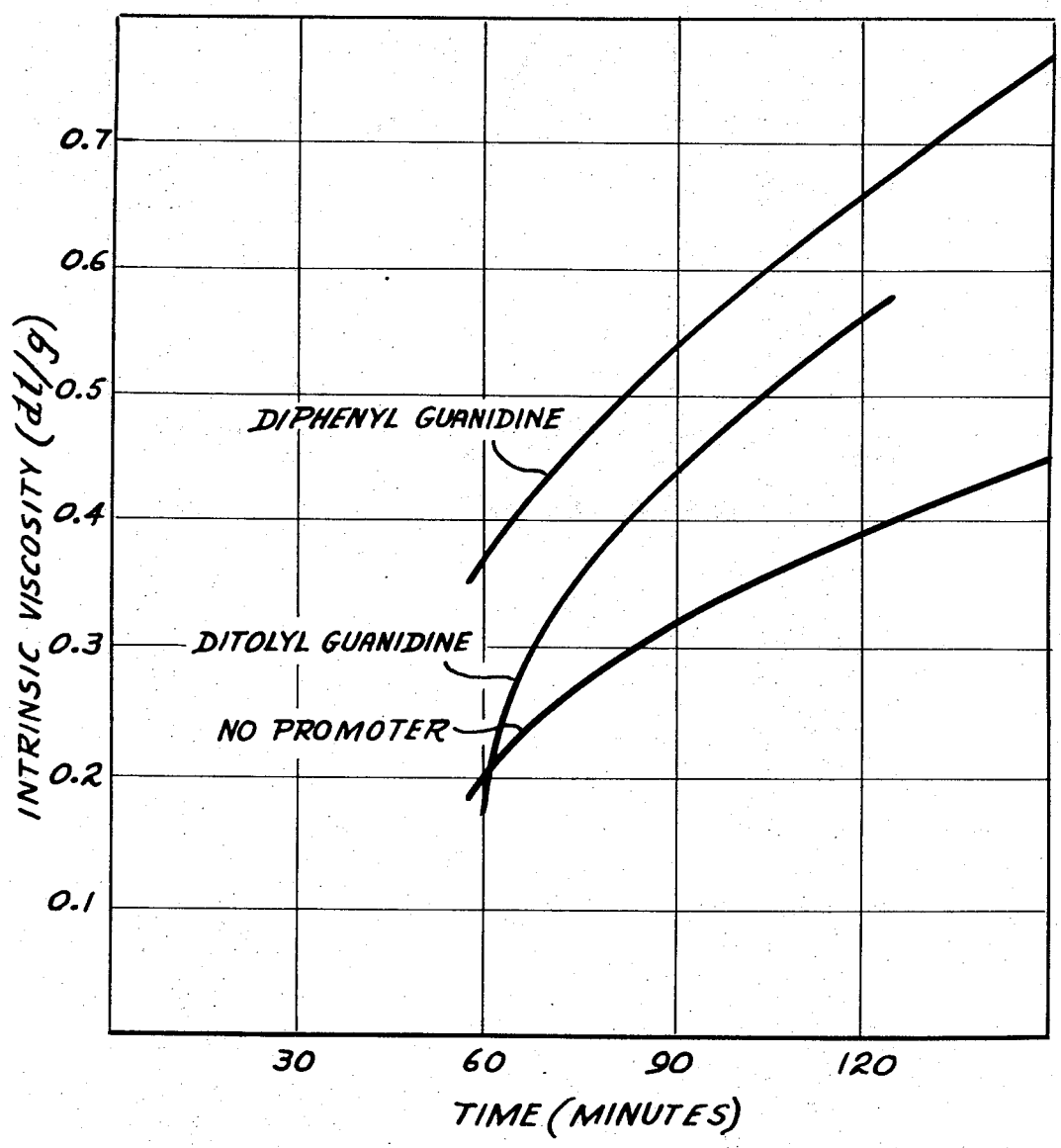

3,544,515
DIARYLGUANIDINES AS RATE PROMOTERS IN OXIDATIVE POLYPHENYLENE ETHER FORMATION
Arthur Katchman and Glen D. Cooper, Delmar, N.Y., assignors to General Electric Company, a corporation of New York
Filed Mar. 13, 1969, Ser. No. 806,929
Int. Cl. C08g 23/18
U.S. Cl. 260—47           17 Claims

ABSTRACT OF THE DISCLOSURE

A process for the formation of high molecular weight polyphenylene ethers by the oxidative coupling of a phenolic precursor in the presence of a catalyst comprising a primary, secondary or tertiary amine and a copper salt; the process being characterized by the addition of a small but effective amount of a diarylguanidine. The diarylguanidine acts to promote reaction rate, provides higher molecular weight polymer than otherwise available and provides substantially decreased reaction time or decreased catalyst levels. Illustrative of the invention is the polymerization of 2,6-xylenol in an aromatic solvent medium using a catalyst comprising about 1 mole cupric bromide, 15 moles dibutyl amine, and ½ mole diphenyl guanidine; the concentration of catalyst components based upon 100 moles of 2,6-xylenol.

BACKGROUND OF THE INVENTION

Field of the invention

This invention relates to the formation of synthetic resins from phenols, and more particularly, to the formation of polyphenylene ethers by the self-condensation of phenols in the presence of a catalyst comprising an amine-copper salt complex.

Description of the prior art

The polyphenylene ethers and processes for their formation are known in the art and described in U.S. Pats. Nos. 3,306,874 and 3,306,875 of Allan S. Hay, and copending applications Ser. Nos. 807,126 and 807,076, filed concurrently herewith. The process involves the self-condensation of a monovalent phenolic precursor using a catalyst formed from an amine and a copper salt. The phenols which may be polymerized by the process correspond to the following structural formula:

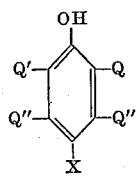

where X is a substituent selected from the group consisting of hydrogen, chlorine, bromine, and iodine; Q is a monovalent substituent selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and phenol nucleus; and Q' and Q'' are the same as Q and in addition, halogen; with the proviso that Q, Q', and Q'' are all free of a tertiary alpha-carbon atom.

Polymers formed from the above noted phenols will correspond to the following structural formula:

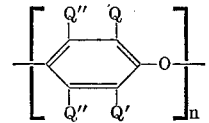

where the oxygen ether atom of one repeating unit is connected to the phenyl nucleus of the next repeating unit; Q, Q' and Q'' are as above defined; and $n$ is a whole integer equal to at least 100.

SUMMARY OF THE INVENTION

The subject invention provides an improved process for the formation of polyphenylene ethers using the reactants of the above-noted patents and applications and is predicated upon the discovery that the addition of a small but effective amount of a diaryl guanidine to a reaction mixture comprising a phenol, an amine and a copper salt provides polymer of higher molecular weight in substantially decreased reaction time or at substantially reduced catalyst concentration.

DESCRIPTION OF THE PREFERRED EMBODIMENTS

Polymer is formed in accordance with the invention by passing an oxygen-containing gas through a solution containing the phenolic precursor, the catalyst formed from the amine and copper salt, and the diaryl guanidine. The phenols preferred for purposes of the present invention correspond to the following formula:

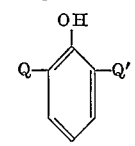

where Q and Q' are as above defined. Examples of preferred phenols include 2,6-dimethylphenol, 2,6-diethylphenol, 2,6-diphenylphenol, 2-methyl-6-phenylphenol and 2-methyl-6-ethylphenol. The most preferred phenol is 2,6-dimethylphenol.

The catalyst is one formed from either a cuprous salt or a basic or non-basic cupric salt. Typical examples of suitable copper salts in accordance with the above-noted patents and applications include cuprous chloride, cupric chloride, cuprous bromide, cupric bromide, cuprous sulfate, cupric sulfate, cuprous acetate, cupric butyrate and cupric nitrate. The concentration of copper salt is desirably maintained low and preferably varies from about 0.2 to 2.5 moles per 100 moles of phenolic monomer.

The amine component of the catalyst may be any of a primary, secondary or tertiary amine exemplified by mono-, di-, and trimethylamine, mono-, di-, and triethylamine, mono-, di-, and tripropylamine, mono-, di-, and tributylamine, mono- and di-secondary propylamine, mono-, di- and tri-benezylamine, ethylmethylamine, methylpropylamine, morpholine, dimethylpropylamine, allyldiethylamine, N,N,N'-trialkylethyldiamine, N,N,N',N'- tetraalkylethylenediamines, the N,N,N',N'-tetraalkylpropyldiamines and the like. Additional examples of suitable amines can be found in the above-noted patents and applications. The concentration of amine in the reaction mixture may vary within wide limits, but is desirably added in low concentration. A preferred range comprises from 2.0 to 25.0 moles per 100 moles of monomer.

The diaryl guanidines contemplated may be represented by the following structural formula:

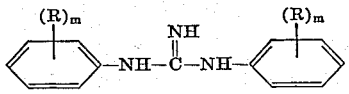

where each R represents lower alkyl, preferably alkyl having from 1 to 4 carbon atoms; and $m$ is a whole integer ranging from 0 to the number of replaceable hydrogen atoms on the benzene nucleus. It should be understood that the diaryl guanidine may be either symmetrical or unsymmetrical, i.e., the substituents on the two benzene rings may be the same or different. The concentration range for the diaryl guanidine in solution may vary within a range of from 0.025 to 3.0 moles per 100 moles of monomer.

It should be understood that while concentration ranges have been set forth for the various reactants in solution, these ranges may vary to some extent dependent upon oxygen flow rate, reaction temperature and the like. For purposes of economy, lower concentration of copper salt amine is prefered. It is characteristic of the subject invention that the use of diaryl guanidine permits formation of high molecular weight polymer with lower concentration of copper salt and amine than would otherwise be required.

The polymerization reaction is performed in a solvent of the general class disclosed in the Hay patents above noted, aromatic solvents such as benzene and toluene providing best results. A low molecular weight alcohol such as methanol may be added to the solution in accordance with the teachings of copending application Ser. No. 807,076. Though the diaryl guanidine acts as a rate promoter in the polymerization reaction in combination with all amine-copper salts catalyst systems, the combination of the diaryl guanidine with some catalysts provides substantially better rates than its combination with others. The reason for this is not fully understood, but is believed to be dependent in part on the copper salt component used to form the catalyst. A preferred catalyst system is one formed from a non-basic supric halide and a secondary alkyl amine.

Experimental results indicate that increased polymerization rate due to the addition of the diaryl guanidine is more pronounced in the latter stages of polymerization than in the earlier stages. The diaryl guanidine may be added initially to the reaction mixture along with the other reactants or at some point subsequent to the initiation of the reaction, for example about 30 minutes after the reaction is initiated. Though not wishing to be bound by theory, a possible explanation for the improved results using the diaryl guanidine is that it prevents precipitation of the amine copper salt catalyst by forming a solvent soluble complex. The catalysts are often insoluble in non-polar solvents unless they are also coupled with a molecule of the phenolic precursor. During the latter stages of polymerization, the concentration of phenolic hydroxyl groups become very low so that the catalyst can no longer be made soluble by coupling with the phenol. It is suggested that the diaryl guanidine, by forming a soluble complex, eliminates the necessity for additional coupling with phenol, so that the catalyst remains soluble and active throughout the polymerization. Although there is little positive evidence for this hypothesis, it appears the most satisfactory rationalization available at present for the effect of the diaryl guanidine.

The invention will be more fully illustrated by the following examples:

EXAMPLE 1

A catalyst premix was prepared in 1400 ml. of toluene from 2.44 grams of cuprous bromide, 17.5 grams of di-butyl amine, 3.6 grams of diphenyl guanidine and 10 grams of a solution of 208 grams of 2,6-xylenol in 250 ml. of toluene. The catalyst solution was rinsed into a 3 liter reaction vessel with 200 ml. of toluene, and pre-oxidized for ten minutes at 260 C. The mixture was stirred at 1500 r.p.m. while oxygen was passed through at a rate of 1.5 cubic feet per hour. The remainder of the xylenol solution was added through a metering pump over a period of 21 minutes, followed by 50 ml. of toluene. One hour after the beginning of monomer addition, the oxygen flow rate was reduced to 0.75 cubic feet per hour and the temperature gradually increased to 35° C. over a period of 30 minutes. At this time, now 90 minutes afer the monomer addition, 70 ml. of 50% acetic acid solution was added and the mixture was centrifuged. The acetic acid functions to kill the polymerization reaction. After centrifuging, the upper phase was poured off as completely as possible. Two 100 ml. portions of the light phase were precipitated separately, one with 200 ml. of methanol and the other with 400 ml. of methanol. The first yielded 9.2 grams of polyphenylene ether and the second 9.3 grams. The remainder of the light phase was precipitated with two volumes of methanol. The total yield of polymer from the light phase was 180.5 grams of polymer having an intrinsic viscosity of 0.59 deciliters per gram (dl./g.) as measured in chloroform at 30° C. The centrifuge bottles and reactor were rinsed with approximately 1000 ml. toluene and the polymer precipitated with methanol yielding 6.2 grams, for a total yield of 186.7 grams (91%).

A second experiment under the same conditions yielded 194.3 grams (95%) of polymer having a viscosity of 0.60 dl./g.

EXAMPLES 2 TO 11

The procedure of Example 1 was repeated with variation in the concentrations of reactants. In addition, in all examples the reaction was permitted to proceed until the intrinsic viscosity of the polymer reacher 0.50 dl./g. and then terminated. The cut-off point for the reaction was determined by periodic sampling. The catalyst used, the concentration of its components expressed in a molar ratio and the time to reach intrinsic viscosity of 0.50 dl./g. is set forth in the following table where the nomenclature DBA refers to dibutyl amine and DPG refers to diphenyl guanidine.

| Example No. | Catalyst | Ratio [1] | Time (min.) |
|---|---|---|---|
| 2 | CuBr-DBA | 100:1:10 | 150 |
| 3 | CuBr-DBA | 100:1:8 | 180 |
| 4 | CuBr-DBA | 100:1:6 | 240 |
| 5 | CuBr-DBA-DPG | 100:1:8:1 | 71 |
| 6 | CuBr-DBA-DPG | 100:1:6:1 | 90 |
| 7 | CuBr-DBA-DPG | 100:1:4:1 | 122 |
| 8 | CuBr-DBA-DPG | 100:1:2:1 | 360 |
| 9 | CuBr-DBA-DPG | 100:1:8:0.5 | 81 |
| 10 | CuBr-DBA-DPG | 100:1:8:0.25 | 95 |
| 11 | CuBr-DBA-DPG | 100:1:8:0.125 | 120 |

[1] Molar ratio of 2,6-xylenol to cuprous bromide to dibutyl amine to diphenyl guanidine where applicable.

For a commercial operation, it is desirable that the intrinsic viscosity build up to approximately 0.50 dl./g. as quickly as possible. From the above data, it can be seen that the reactions performed in the absence of diphenyl guanidine are substantially lower than those performed at the same amine and copper ratios when diphenyl guanidine is present. Comparison of Examples 3 and 11 show that addition of only ⅛ mole of DPG per hundred moles of monomer decreased reaction time by one hour.

EXAMPLES 12 TO 15

The procedure of Examples 2 to 11 was repeated with the substitution of either cuprous chloride or cupric chloride for cuprous bromide with results as set forth in the following table.

| Ex. No. | Catalyst | Ratio[1] | Time (min.) | Remarks |
|---|---|---|---|---|
| 12 | CuCl-DBA | 100:1:8 | [2] >360 | 2½ volume percent methanol added. |
| 13 | CuCl-DBA-DPG | 100:1:8:1 | 120 | Do. |
| 14 | CuCl₂-DBA | 100:1:8 | 180 | Do. |
| 15 | CuCl₂-DBA-DPG | 100:1:8:1 | 68 | Do. |

[1] Molar ratio of 2,6-xylenol to copper salt to amine to diphenyl guanidine where applicable.
[2] Intrinsic viscosity of 0.5 dl./g. not reached during reaction period.

EXAMPLE 16

Following the general procedures outlined in Example 1 above, the polymerization reaction was performed with (1) diphenyl guanidine (2) ditolyl guanidine and (3) no promoter. In each reaction intrinsic viscosity was measured periodically throughout the reaction period with results set forth in the drawing. In all cases, the ratio of 2,6-xylenol to cuprous bromide to dibutyl amine to promoter (where applicable) was maintained at 100:1:8:1. In all cases, where a promoter was used, it was added 30 minutes after initiation of the polymerization reaction. From the drawing, it can be seen that diphenyl guanidine is more effective than the ditolyl guanidine and higher viscosities are reached in the presence of a guanidine than in its absence.

EXAMPLE 17

Repetition of the procedure of Example 16 substituting any of tetramethyl guanidine, triphenyl guanidine, biguanide and di-ortho-tolyl biguanide resulted in no increase in polymerization rate, or, in the case of biguanides, no polymerization whatsoever.

EXAMPLE 18

A solution of 10 grams of 2,6-xylenol in 140 ml. of toluene was stirred by means of a Vibro-Mixer stirrer in a large open test tube. Cuprous bromide (0.143) gram was added, followed by 0.73 gram of diethylamine, 0.123 gram of diphenylguanidine and 5 grams of magnesium sulfate. The mixture was stirred for 5 minutes and oxygen was introduced at a rate of 0.35 cubic feet/hour. At suitable intervals, the stirring was stopped, the magnesium sulfate allowed to settle, and efflux times were measured in a calibrated 4 ml. pippette. At the end of two hours, 4 ml. of 50% acetic acid was added to kill the reaction. The mixture was filtered, and the polymer precipitated. The intrinsic viscosity after two hours was 1.00 dl./g. In a similar experiment without guanidine, the intrinsic viscosity after two hours was 0.84 dl./g.

EXAMPLE 19

The procedure of Example 18 was repeated with the substitution of 0.49 gram of trimethylamine for diethylamine. The intrinsic viscosity after two hours was 1.10 dl./g. In a similar experiment without the diphenyl guanidine, only low molecular weight polymer was obtained.

EXAMPLE 20

The procedure of Example 18 was repeated except that the cuprous bromide was replaced by 0.223 gram of cupric bromide and the diethyl amine was replaced by 1.29 grams of di-n-butyl amine. The intrinsic viscosity after one hour was 0.73 dl./g. In the absence of the diphenyl guanidine, the intrinsic viscosity after one hour was 0.57 dl./g.

EXAMPLE 21

The procedure of Example 18 was repeated except that the diethyl amine was replaced by 0.73 gram of n-butyl amine. The intrinsic viscosity of the polymer after two hours was 0.56 dl./g. Without the guanidine, the polymer had an intrinsic viscosity of 0.40 dl./g. after two hours.

EXAMPLE 22

Catalyst solution was prepared in 100 ml. of toluene from 0.76 gram of anhydrous cupric chloride, 10.9 grams of di-n-butyl amine, 0.32 gram of potassium hydroxide in 6 ml. of methanol, 1.2 grams of diphenyl guanidine, and 4 ml. of a 55% solution of 2,6-xylenol in toluene. Then, 400 ml. of toluene were added and the solution transferred to a 1 litre reactor stirred at 1500 r.p.m. by a 2″ x ¼″ turbine. Oxygen was introduced at a rate of 1.0 cu. feet/hour and 123 grams of a 55% solution of xylenol in toluene was added over a period of eight minutes. After two hours, there was obtained 67.2 grams of poly(2,6-dimethyl-1,4 phenylene) ether having an intrinsic viscosity of 0.71 dl./g. In a similar experiment without the guanidine, the intrinsic viscosity after two hours was 0.16 dl./g.

It should be understood that changes may be made in the embodiments described above without departing from the invention as defined by the following claims.

We claim:

1. In a process for the preparation of a polyphenylene ether comprising an oxidative coupling reaction of a phenolic precursor corresponding to the structural formula

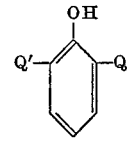

where Q is a monovalent substituent selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and phenol nucleus, and Q' is the same as Q and in addition, halogen, with the proviso that Q and Q' are free of tertiary alpha-carbon atoms, in the presence of a catalyst comprising an amine and a copper salt; the improvement comprising the addition to the reaction of from 0.025 to 3.0 moles per 100 moles of said phenolic precursor of a diaryl guanidine of the formula

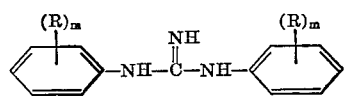

where each R represents lower alkyl and $m$ is an integer varying between 0 and the number of replaceable hydrogen atoms of the benzene nucleus.

2. The process of claim 1 where Q and Q' are methyl.

3. The process of claim 1 where $m$ is 0.

4. The process of claim 1 where the amine is an alkyl amine.

5. The process of claim 1 where the copper salt is a copper halide.

6. The process of claim 1 where the catalyst is formed from dibutyl amine and non-basic cupric bromide.

7. The process of claim 1 where the concentration of the copper salt is of from 0.2 to 2.5 moles, the concentration of the amine is from 2.0 to 25.0 moles and the concentration of the diaryl guanidine is from 0.025 to 3.0, all based upon 100 moles of phenol.

8. The process of claim 7 where the solvent for the system is an aromatic solvent.

9. The process of claim 1 including a low molecular weight alcohol in the reaction mixture.

10. The process of claim 9 where the alcohol is methanol.

11. In a process for the formation of a poly-(2,6-dimethyl-1,4-phenylene) ether comprising an oxidative coupling reaction of 2,6-dimethylphenol in the presence of a catalyst comprising an amine and a copper salt, the improvement comprising the addition to the reaction of from 0.02 to 3.0 moles per 100 moles of 2,6-dimethylphenol of a diaryl guanidine of the formula

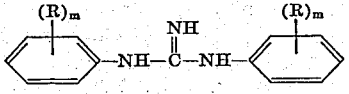

where each R represents lower alkyl and $m$ is a whole integer varying between 0 and the number of replaceable hydrogen atoms of the benzene nucleus.

12. The process of claim 13 where the diaryl guanidine is diphenyl guanidine.

13. The process of claim 12 where the catalyst is formed from an alkyl amine and a copper halide.

14. The process of claim 13 where the amine is dibutylamine and the copper halide is cupric bromide.

15. The process of claim 13 where the amine is present in an amount of from 2.0 to 25.0 moles and the copper salt is in an amount of from 0.2 to 2.5 moles, both each based upon 100 moles of phenol.

16. The process of claim 13 performed in an aromatic solvent.

17. The process of claim 16 where the reaction mixture contains methanol.

References Cited

UNITED STATES PATENTS

| | | | |
|---|---|---|---|
| 3,306,874 | 2/1967 | Hay | 260—47 |
| 3,306,875 | 2/1967 | Hay | 260—47 |
| 3,384,619 | 5/1968 | Hori et al. | 260—47 |
| 3,400,100 | 9/1968 | van Dort et al. | 260—47 |

OTHER REFERENCES

Cherubim, Kaut. Gummi Kunstst. 19(11), 676–82 (1966).

HAROLD D. ANDERSON, Primary Examiner

M. GOLDSTEIN, Assistant Examiner